Patented Dec. 27, 1949

2,492,170

UNITED STATES PATENT OFFICE 2,492,170

SYNTHETIC RUBBERLIKE MATERIALS FROM AN ALKYL ACRYLATE AND A HALOALKYL ACRYLATE

William C. Mast, Philadelphia, Chessie E. Rehberg, Glenside, and Charles H. Fisher, Abington, Pa., assignors to United States of America as represented by the Secretary of Agriculture No Drawing. Application May 25, 1945, Serial No. 595,870

3 Claims. (Cl. 260—86.1)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to synthetic rubbers prepared from alkyl acrylate polymers and copolymers.

It is known that the polymers of methyl acrylate, ethyl acrylate, and of other normal alkyl acrylates, are soft and flexible. Furthermore, it is known that useful flexible materials can be made by blending acrylic resins with other materials or by incorporating fillers and pigments into them. The resulting products, however, lack some of the desirable characteristics found in rubber and in certain synthetic rubbers, and several unsuccessful attempts have been made to transform the flexible alkyl acrylate polymers into true synthetic rubbers. Vulcanization does not occur when alkyl acrylate polymers, such as polymethyl acrylate and polyethyl acrylate, are heated with sulfur. We have attempted vulcanization by heating such polymers containing sulfur, and mixtures of such polymers, sulfur, carbon black, and some of the standard accelerators used with rubber, without successful results. No appreciable change is brought about by heating such mixtures, and the products lack many of the desirable properties found in vulcanized rubber and vulcanized synthetic rubbers.

An object of this invention, accordingly, is to produce vulcanized alkyl acrylate polymers having enhanced rubberlike properties and capable of being used in place of rubber.

A further object is to prepare alkyl acrylate polymers, which can be compounded and milled with materials, such as vulcanizing agents, vulcanization accelerators, vulcanization accelerator activators, and reinforcing agents, commonly employed in the vulcanization of rubber on standard rubber rolls and equipment and cured or vulcanized in standard rubber molds to give vulcanized rubberlike products.

A further object is to produce synthetic rubbers which have greater resistance to light, oils, oxidation, aging, and heat, than have natural rubber and some of the previously described synthetic rubbers.

A further object is to provide synthetic rubbers which can be made from carbohydrates, an abundant and reproducible raw material.

A further object is to provide methods for copolymerizing methyl acrylate, ethyl acrylate, and similar alkyl acrylates with various quantities of other monomers including substituted alkyl acrylates, to obtain essentially saturated copolymers which can be vulcanized by certain suitable agents which we have found to be effective.

Other objects and advantages of the invention will appear hereinafter.

We have found that synthetic rubbers can be made by copolymerizing a mixture of from 80 to 95 percent, by weight, on the basis of the polymerizable components, of alkyl acrylate, such as methyl, ethyl, butyl, octyl, and other normal acrylates and methacrylates, with from 20 to 5 percent of either (a) monomers having only one polymerizable double bond such as aryl acrylates, which include aryl methacrylates, as for example, phenyl and benzyl acrylate, phenyl methacrylate, and so forth, or with (b) monomers having only one polymerizable double bond, and in addition, having a halogen, cyano, ketone, or other similar group as a substituent. Compounds of this type which are preferred are the haloalkyl acrylates wherein the halogen is selected from the class consisting of chlorine and bromine, such as chloroethyl acrylate, bromoethyl acrylate, chloropropyl acrylate, 1,3-dichloro-2-propyl acrylate, bromopropyl acrylate, and so forth. Other compounds of this type which may be used are cyanoethyl acrylate, methyl chloroacrylate, vinyl bromopropionate, bromopropyl methacrylate, chloroallyl lactate, vinylidene chloride, and so forth. The resulting copolymers are then compounded with a vulcanizing agent, such as sulfur and quinone dioxime; a vulcanization accelerator, such as mercaptobenzothiazole, tetramethylthiuram disulfide, and others; an accelerator activator such as stearic acid; and a reinforcing agent, such as carbon black, red lead, litharge, zinc oxide, and so forth. The resulting mixtures are then heated under the general conditions commonly used to vulcanize rubber and synthetic rubbers.

Although olefinic unsaturation has usually been considered necessary for vulcanization, the copolymers described herein are essentially saturated, but are vulcanizable by the agents and techniques of the present invention. It is advantageous to vulcanize saturated copolymers, since cross-linkage usually occurs when unsaturated copolymers are made by polymerizing such monomers as butadiene, isoprene, allyl fumarate, divinylbenzene, and so forth.

Emulsion polymerization, as described in the following paragraph, was used as a matter of convenience to prepare the copolymers, but these can also be made by solution and mass polymerization. Acrylonitrile, or other polymerization regulators such as dodecyl mercaptan, carbon tetrachloride, hexachloroethane, xanthogen disulfide, and trichloropropionitrile, can be employed, but synthetic rubbers can be obtained without their use.

The polymerizations were carried out in round-bottomed, three-necked, Pyrex-glass flasks fitted with a thermometer well, a reflux condenser, and a water-sealed stirrer (ground-glass joints). The stirrers were of the paddle, anchor, or half-moon type and were rotated at 75 to 150 R. P. M. The monomer mixture was added to water and an emulsifying agent in the flask, stirred, and heated to about refluxing temperature. The desired amount of catalyst was then added, either all at once or in several portions. Heating was applied if necessary to maintain gentle refluxing, and the course of the polymerization was followed by noting changes in the refluxing temperature. When refluxing ceased in spite of heating (usually about 92° C.), the polymerization was finished. The emulsion was then poured into a beaker and coagulated by the addition of a dilute solution of sodium chloride, washed with water, and dried.

Data on some polymerizations and vulcanizations and the properties of the resulting vulcanizates are shown in the following tables, Nos. I through IX.

TABLE III

*Physical properties of vulcanizates of Table II*

| Example No. | Tensile strength, lbs./sq. in. | Elongation at break, per cent | Shore A Hardness |
|---|---|---|---|
| 1 | 1,410 | 480 | 65 |
|   | 640 | 490 | 45 |
|   | 1,320 | 260 | 72 |
| 2 | 1,000 | 420 | 53 |
|   | 830 | 1,040 | 50 |
|   | 1,610 | 400 | 64 |
| 3 | 870 | 500 | 45 |
|   | 1,280 | 880 | 46 |
|   | 960 | 180 | 75 |
| 4 | 570 | 480 | 42 |
|   | 790 | 780 | 50 |
|   | 1,090 | 340 | 55 |
| 5 | 1,670 | 450 | 65 |
| 6 | 510 | 440 | 45 |
|   | 1,090 | 860 | 48 |
| 7 | 470 | 410 | 31 |
|   | 760 | 440 | 41 |
| 8 | 1,350 | 460 | 56 |
|   | 1,050 | 280 | 50 |
|   | 1,220 | 720 | 42 |
| 9 | 1,180 | 470 | 56 |
|   | 820 | 560 | 45 |
| 10 | 1,420 | 340 | 70 |
|   | 870 | 520 | 52 |
| 11 | 780 | 640 | 47 |

TABLE I

*Preparation of acrylic resins*

| Example No. | Ethyl Acrylate g. | Comonomer | Amount | Acrylonitrile, g. | Alkyl Sodium Sulfate (Emulsifier), g. | Ammonium Persulfate (Catalyst), g. | Water, ml. | Temp., °C. | Time, hrs. | Yield of Copolymer, Per Cent |
|---|---|---|---|---|---|---|---|---|---|---|
| 1 | 142.5 | Benzyl Acrylate | 7.5 g. | 0.0 | 4.0 | 0.03 | 250 | 78–92 | 2 | 91.0 |
| 2 | 142.5 | ---do--- | --- | 7.5 | 4.0 | 0.02 | 250 | 78.92 | 4¼ | 88.5 |
| 3 | 142.5 | Beta-Chloroethyl Acrylate | 7.5 g. | 0.0 | 4.0 | 0.015 | 300 | 78–92 | 1½ | 90.0 |
| 4 | 95.0 | Phenyl Acrylate | 5.0 g. | 0.0 | 3.0 | 0.10 | 150 | 75–92 | ⅚ | 90.0 |
| 5 | 142.5 | Methyl Carbitol Acrylate | 7.5 g. | 0.0 | 4.0 | 0.03 | 300 | 80–92 | 1¼ | 93.5 |
| 6 | 142.5 | Beta-Cyanoethyl Acrylate | 7.5 g. | 0.0 | 4.0 | 0.03 | 300 | 80–92 | 1¾ | 91.0 |
| 7 | 142.5 | 2-Methyl-2-Nitro-1-Propyl Acrylate | 7.5 g. | 0.0 | 4.0 | 0.02 | 300 | 77–92 | 1¾ | 91.0 |
| 8 | 135.0 | Beta-Chloroethyl Acrylate | 15.0 g. | 0.0 | 4.0 | 0.015 | 300 | 82–91 | 2 | 88.0 |
| 9 | 89.0 | ---do--- | 5.0 g. | 6.0 | 3.0 | 0.12 | 150 | 78–91 | 1¾ | 92.0 |
| 10 | 142.5 | --- | --- | 7.5 | 4.0 | 0.045 | 300 | 78–91 | 4½ | 90.5 |
| 11 | --- | n-Butyl Acrylate | 150 ml. | --- | 4.0 | 0.05 | 250 | 85–93 | 3 | 89.0 |

TABLE II

*Vulcanization of copolymers of Table I*

| Example No. | Compounding Formula in Parts per 100 Parts of Copolymer | | | | | | | | | Vulcanization at 298° F., min. |
|---|---|---|---|---|---|---|---|---|---|---|
|  | Red lead | Zinc oxide | Stearic acid | Quinone dioxime | Carbon black | Iron oxide | 23% benzoyl peroxide | Mercapto-benzo-thiazole | Tetramethyl-thiuram disulfide |  |
| 1 | 10 | 5 | 3 | 2 | 30 |  |  |  |  | 240 |
|   |  |  |  |  |  | 150 | 5 |  |  | 120 |
| 2 | 10 | 5 | 3 | 2 | 30 |  |  |  |  | 240 |
|   |  |  |  |  |  | 150 | 5 |  |  | 180 |
|   |  | 10 | 2 |  | 30 |  |  | .5 | 1 | 240 |
| 3 | 10 | 5 | 3 | 2 | 30 |  |  |  |  | 120 |
|   |  |  |  |  |  | 150 | 5 |  |  | 240 |
|   |  | 10 | 2 |  | 30 |  |  | .5 | 1 | 240 |
| 4 | 10 | 5 | 3 | 2 | 30 |  |  |  |  | 240 |
|   |  |  |  |  |  | 150 | 5 |  |  | 20 |
| 5 | 10 | 5 | 3 | 2 | 30 |  |  | .5 | 1 | 240 |
| 6 | 10 | 5 | 3 | 2 | 30 |  |  |  |  | 240 |
|   |  |  |  |  |  | 150 | 5 |  |  | 120 |
| 7 | 10 | 5 | 3 | 2 | 30 |  |  | .5 | 1 | 80 |
|   |  |  |  |  |  | 150 | 5 |  |  | 120 |
| 8 | 10 | 5 | 3 | 2 | 30 |  |  |  |  | 120 |
|   |  |  |  |  |  | 150 | 5 |  |  | 180 |
| 9 |  | 10 | 2 |  | 30 |  |  | .5 | 1 | 180 |
|   | 10 | 5 | 3 | 2 | 30 |  |  |  |  | 120 |
|   |  |  |  |  |  | 150 | 5 |  |  | 240 |
| 10 | 10 | 5 | 3 | 2 | 30 |  |  |  |  | 180 |
|   |  |  |  |  |  | 150 | 5 |  |  | 240 |
| 11 | 10 | 5 | 3 | 2 | 30 |  |  |  |  | 120 |
|   |  |  |  |  |  |  |  |  |  | 60 |

TABLE IV

*Vulcanization of ethyl acrylate-chloropropyl acrylate copolymers*

| Example No. | Compounding formula in parts per 100 parts of copolymers | | | | | | | | | | | | | | | | Vulcanization | |
|---|---|---|---|---|---|---|---|---|---|---|---|---|---|---|---|---|---|---|
| | A | B | C | D | E | F | G | H | I | J | K | L | M | N | O | P | Time, min. | Temp., °F. |
| 12 | 0.5 | 10 | 2 | 2 | 30 | 1 | | | | | | | | | | | 180 | 312 |
| 13 | 0.5 | 10 | 2 | 2 | 50 | 1 | 5 | | | | | | | | | | 240 | 298 |
| 14 | 0.5 | 10 | 2 | 2 | 50 | 1 | 10 | | | | | | | | | | 360 | 298 |
| 15 | 0.5 | 10 | 2 | 2 | 75 | 1 | 20 | | | | | | | | | | 240 | 298 |
| 16 | | 5 | | | 30 | | | 10 | 2 | | | | | | | | 60 | 298 |
| 17 | | 10 | | 2 | 30 | 1 | | | | 0.5 | | | | | | | 180 | 298 |
| 18 | 0.5 | 10 | | 2 | 30 | | | | | | 1 | | | | | | 300 | 298 |
| 19 | | 10 | | 2 | 30 | | | | | 0.5 | 1 | | | | | | 300 | 298 |
| 20 | | 10 | 2 | | 30 | | | | | | | | 1 | | | | 300 | 298 |
| 21 | 0.38 | 10 | 2 | | 30 | | .75 | | | | | | 3 | | | | 240 | 298 |
| 22 | | 10 | | | 30 | | | | | | | | | 4 | 10 | | 360 | 298 |
| 23 | 0.5 | 10 | 2 | 2 | | 1 | | | | | | | | | | 80 | 240 | 298 |

NOTE 1.—The alphabetical characters shown under the above compounding formula have the following significance:

A—Purified mercaptobenzothiazole  
B—Zinc oxide  
C—Stearic acid  
D—Sulfur  
E—Carbon black  
F—Tetramethylthiuram disulfide  
G—An ester type plasticizer  
H—Red lead  
I—Quinone dioxime  
J—Cupric salt of mercaptobenzothiazole  
K—Cupric diethyldithiocarbamate  
L—Polymerized di-nitrosobenzene  
M—An organic polysulfide (polyethylene polysulfide)  
N—p-dinitrobenzene  
O—Litharge  
P—Finely ground calcium carbonate NOTE 2.—The copolymer was made from 95% ethyl acrylate and 5% 3-chloropropyl acrylate.
NOTE 3.—The compounded mixtures were cured in 4 x 4 x 0.23 inch molds.
NOTE 4.—The copolymer used in the above vulcanizations was prepared from 200 g. of gamma-chloropropyl acrylate, 4,000 ml. of ethyl acrylate, 5,000 ml. of water, 80 g. of sodium alkyl sulfate, 40 g. of the sodium salt of aryl alkyl polyether sulfonate, and 0.035 g. of ammonium persulfate. The polymerization was carried out at about from 82° to 90° C. and was finished in about 3 hours.
NOTE 5.—The ester type plasticizer mentioned under G is a glycol di-octoate.

TABLE V

*Physical properties of vulcanizates of Table IV*

| Example No. | Tensile Strength, lbs./sq. in. | Modulus at 600% | Ultimate Elongation, percent | Shore A Hardness | Permanent Set at Break, percent | Permanent Set (10 min.), percent | Tensile Product |
|---|---|---|---|---|---|---|---|
| 12 | 1,210 | 830 | 790 | 48 | 13.7 | 21.4 | 956 |
| 13 | 1,170 | 1,080 | 690 | 46 | | | 806 |
| 14 | 1,190 | 730 | 690 | 40 | | | 822 |
| 15 | 880 | 490 | 880 | 40 | | | 774 |
| 16 | 1,530 | 1,450 | 650 | 55 | 25.5 | 34.9 | 994 |
| 17 | 1,490 | 660 | 940 | 40 | | | 1,400 |
| 18 | 1,370 | 1,070 | 740 | 43 | | | 1,014 |
| 19 | 1,440 | 990 | 790 | 43 | | | 1,138 |
| 20 | 1,460 | 1,180 | 700 | 41 | | | 1,022 |
| 21 | 980 | 370 | 920 | 38 | | | 902 |
| 22 | 1,340 | | 560 | 35 | | | 750 |
| 23 | 1,280 | 1,240 | 610 | 47 | | | 780 |

TABLE VI

*Vulcanization of halogen-containing acrylic resins*

| Example No. | Monomers | Grams | Compounding Formula in parts per 100 parts of Copolymer [1] | | | | | | | | | | | | Vulcanization | |
|---|---|---|---|---|---|---|---|---|---|---|---|---|---|---|---|---|
| | | | A | B | C | D | E | F | G | H | I | J | K | L | Time, min. | Temp., °F. |
| 24 | Ethyl Acrylate | 190 | .5 | 10 | 2 | 2 | 30 | 1 | | | | | | | 120 | 298 |
| 25 | 2-Bromoethyl Acrylate | 10 | | 10 | 3 | | 30 | | 10 | 2 | | | | | 60 | 298 |
| 26 | 3-Chloropropyl Acrylate | 100 | .5 | 10 | 2 | 2 | 30 | 1 | | | | | | | 60 | 298 |
| 27 | Ethyl Acrylate | 180 | .5 | 10 | 2 | 2 | 30 | 1 | | | | | | | 180 | 298 |
| 28 | 3-Chloropropyl Acrylate / Acrylonitrile | 10 / 10 | | 10 | 3 | | 30 | | 10 | 2 | | | | | 120 | 298 |
| 29 | n-Octyl Acrylate / 3-Chloropropyl Acrylate | 90 / 10 | | 10 | 3 | | 30 | | 10 | 2 | 60 | | | | 240 | 298 |
| 30 | n-Butyl Acrylate / Ethyl Acrylate | 40 / 140 | .5 | 10 | 2 | 2 | 30 | 1 | | | | | | | 180 | 298 |
| 31 | 3-Chloropropyl Acrylate | 20 | | 10 | 3 | | 30 | | 10 | 2 | | | | | 60 | 298 |
| 32 | Ethyl Acrylate / 3-Chloropropyl Acrylate | 95 / 5 | | 10 | 2 | | 30 | | | | | 2 | | | 180 | 296 |
| 33 | | | | 10 | 3 | | 30 | | 10 | 2 | | | .5 | | 30 | 298 |
| 34 | Ethyl Acrylate | 90 | | 10 | 2 | | 30 | | | | | | 1 | 10 | 30 | 298 |
| 35 | 3-Chloropropyl Acrylate | 10 | .5 | 5 | 2 | 2 | 30 | 1 | | | | | .5 | 5 | 60 | 298 |
| 36 | | | .5 | 10 | 2 | 2 | 30 | 1 | | | | | 1 | | 15 | 298 |

[1] The alphabetical characters shown hereunder have the following significance:

A—Purified mercaptobenzothiazole  
B—Zinc oxide  
C—Stearic acid  
D—Sulfur  
E—Carbon black  
F—Tetramethylthiuram disulfide  
G—Red lead  
H—Quinone dioxime  
I—Special furnace reinforcing black  
J—Polymerized di-nitrosobenzene  
K—Triethylene tetramine  
L—Calcined magnesia

TABLE VII

*Physical properties of vulcanizates of Table VI*

| Example No. | Tensile strength, lbs./sq. in. | Ultimate Elongation, percent | Shore A Hardness |
|---|---|---|---|
| 24 | 1,390 | 860 | 43 |
| 25 | 1,510 | 520 | 48 |
| 26 | 890 | 350 | 50 |
| 27 | 1,420 | 600 | 53 |
| 28 | 1,550 | 460 | 61 |
| 29 | 940 | 170 | 88 |
| 30 | 1,330 | 650 | 46 |
| 31 | 1,390 | 470 | 58 |
| 32 | 1,540 | 770 | 46 |
| 33 | 1,350 | 700 | 47 |
| 34 | 1,420 | 620 | 43 |
| 35 | 1,270 | 730 | 47 |
| 36 | 1,460 | 830 | 42 | chlorine can be used for the same purpose. For example, bromine atoms in a copolymer chain also act as active centers in vulcanization processes.

Reinforcing agents, fillers, accelerators, and so forth, can be added to the copolymers on a rubber mill or any mixer, or the ingredients can be added to an emulsion or a solution of the copolymers. Solutions of the copolymers containing vulcanizing agents, accelerators, and so on, are useful as rubber cements. The copolymers of this invention which have halogen, cyano, ketone, or other groups capable of facilitating vulcanization, can be vulcanized or cross-linked by various vulcanizing mixtures. For example, a halogen-containing copolymer may be vulcanized with (a) quinone dioxime and red lead, (b) sulfur

TABLE VIII

*Vulcanization of halogen-containing acrylic resins*

| Example No. | Monomers | Grams | Compounding Formula in parts per 100 parts of Copolymer [1] | | | | | | | | | | | | Vulcanization | |
|---|---|---|---|---|---|---|---|---|---|---|---|---|---|---|---|---|
| | | | A | B | C | D | E | F | G | H | I | J | K | L | Time, min. | Temp., °F. |
| 37 | 1,3-Dichloro-2-propyl Acrylate | 20 | .5 | 10 | 3 | | 30 | | 10 | 2 | | | | | 120 | 298 |
| 38 | Ethyl Acrylate | 180 | .5 | 10 | 2 | 2 | 30 | 1 | | | | | | | 120 | 298 |
| 39 | 3-Bromopropyl Acrylate | 14 | .5 | 10 | 3 | | 30 | | 10 | 2 | | | | | 30 | 298 |
| 40 | Ethyl Acrylate | 186 | .5 | 10 | 2 | 2 | 30 | 1 | | | | | | | 30 | 298 |
| 41 | 2-Chloroallyl Lactate | 10 | | 10 | 3 | | 30 | | 10 | 2 | | | | | 60 | 298 |
| | Ethyl Acrylate | 190 | | | | | | | | | | | | | | |
| 42 | Chloropropyl Acrylate | 10 | .5 | 10 | 2 | 2 | 30 | 1 | | | | | | | 180 | 298 |
| 43 | Ethyl Acrylate | 70 | | 10 | 3 | | 30 | | 10 | 2 | | | | | 120 | 298 |
| | n-Octyl Acrylate | 20 | | | | | | | | | | | | | | |
| 44 | Ethyl Acrylate | 90 | | 10 | 2 | | 30 | 1 | | | | 2 | | | 60 | 320 |
| | 3-Chloropropyl Acrylate | 10 | | | | | | | | | | | | | | |
| 45 | Ethyl Acrylate | 85 | .5 | 10 | 2 | 2 | 30 | 1 | | | | | 1 | 10 | 30 | 298 |
| 46 | Vinylidene Chloride | 15 | .5 | 10 | 2 | | 30 | | | | | | 1 | 10 | 30 | 298 |
| 47 | 3-Chloropropyl Acrylate | 7 | | 10 | 3 | | 30 | | 10 | 2 | | | | | 120 | 298 |
| 48 | Sec-Butyl Acrylate | 93 | .5 | 10 | 2 | 2 | 30 | 1 | | | | | | | 180 | 298 |
| 49 | 2-Chloroethyl Acrylate | 40 | .5 | 10 | 2 | 2 | 30 | 1 | | | | | | | 120 | 298 |
| 50 | Ethyl Acrylate | 160 | | 10 | 3 | | 30 | | 10 | 2 | | | | | 30 | 298 |
| 51 | CH$_2$:CHCOOCH$_2$CH$_2$OCH$_2$CH$_2$Cl | 10 | .5 | 10 | 2 | 2 | 30 | 1 | | | | | | | 360 | 298 |
| 52 | Ethyl Acrylate | 190 | | 10 | 3 | | 30 | | 10 | 2 | | | | | 180 | 298 |

[1] The alphabetical characters shown hereunder have the following significance:

A—Purified mercaptobenzothiazole
B—Zinc oxide
C—Stearic acid
D—Sulfur
E—Carbon black
F—Tetramethylthiuram disulfide
G—Red lead
H—Quinone dioxime
I—Special furnace reinforcing black
J—Polymerized di-nitrosobenzene
K—Triethylene tetramine
L—Calcined magnesia

TABLE IX

*Physical properties of vulcanizates of Table VIII*

| Example No. | Tensile strength, lbs./sq. in. | Ultimate Elongation, percent | Shore A Hardness |
|---|---|---|---|
| 37 | 1,410 | 490 | 47 |
| 38 | 1,260 | 720 | 45 |
| 39 | 940 | 270 | 55 |
| 40 | 1,350 | 700 | 34 |
| 41 | 1,130 | 560 | 49 |
| 42 | 1,320 | 860 | 37 |
| 43 | 1,470 | 470 | 54 |
| 44 | 1,490 | 570 | 41 |
| 45 | 1,150 | 620 | 51 |
| 46 | 1,000 | 780 | 47 |
| 47 | 1,300 | 460 | 51 |
| 48 | 1,060 | 520 | 38 |
| 49 | 1,280 | 520 | 41 |
| 50 | 1,270 | 680 | 43 |
| 51 | 1,360 | 560 | 50 |
| 52 | 1,630 | 540 | 61 |

The discovery that halogen, cyano, ketone (—CH$_2$CO—), and similar groups can be used instead of olefinic linkages to facilitate vulcanization has broad application. Halogens other than and accelerators, (c) peroxides, (d) dinitrobenzene and lead oxides, (e) polymerized dinitrosobenzene, and (f) amines, such as triethylene tetramine. Amines may function as vulcanizing agents or as accelerators when other vulcanizing agents are used. For example, the use of one part of triethylene tetramine per 100 parts of copolymer as an additional ingredient in a sulfur-purified mercaptobenzothiazole-tetramethylthiuram disulfide recipe greatly decreased the curing time.

This invention is a valuable advance in the art as it extends the range of known synthetic rubbers, giving new substitutes for rubber which have, in some respects, advantages over rubber. Furthermore, the synthetic rubbers described herein can be made almost entirely (through lactic acid as intermediate) from carbohydrates, an abundant, domestic, and reproducible raw material. The source of the comonomers used with the alkyl acrylate in making the copolymer is relatively unimportant because small proportions can be used and many types are suitable.

The compounding ingredients listed in Tables II, IV, VI, and VIII, were milled into the copolymers on a standard rubber mill which had steam-heated rolls. The polymers were tacky and required little or no break-down before forming a rolling bank. Large amounts of carbon black could be milled into the copolymer. The compound mixtures were cured and tested with equipment and techniques used in the rubber and the synthetic rubber industries. The vulcanized products were soft, flexible, elastic, and rubberlike in appearance and feel, insoluble in hydrocarbon solvents and in water, and resistant to oxygen, aging, and heat.

The practice of the invention is not limited to the agents shown in the foregoing tables. For example, many emulsifiers can be used instead of alkyl sodium sulfate, and various peroxides and percompounds can be used to initiate the polymerizations.

Other monomers having only one polymerizable double bond, in addition to those shown in the foregoing tables, which were used to prepare essentially saturated and vulcanizable acrylic copolymers, include vinyl chloride, vinylidene chloride, chloroethyl vinyl ether, chloromaleic anhydride, methyl chloroacrylate, vinyl bromopropionate, bromopropyl methacrylate, chloroethyl maleate, chloroacrylonitrile, methacrylonitrile, styrene, vinyl butyl ether, isopropenyl acetate, alpha-chlorostyrene, methyl chloromaleate, and others.

Having thus described our invention, we claim:

1. A process of preparing a copolymer comprising copolymerizing a mixture of from 80 to 95 percent, by weight, on the basis of the polymerizable components, of alkyl acrylate, with from 20 to 5 percent of 3-chloropropyl acrylate.

2. A process of preparing a synthetic rubber comprising preparing a copolymer by copolymerizing a mixture of from 80 to 95 percent, by weight, on the basis of the polymerizable components, of alkyl acrylate, with from 20 to 5 percent of 3-chloropropyl acrylate, and vulcanizing the copolymer thus prepared by compounding it with quinone dioxime and red lead as a vulcanizing agent and heating until vulcanization is effected.

3. A process of preparing a copolymer comprising copolymerizing a mixture of from 80 to 95 percent, by weight, on the basis of the polymerizable components, of alkyl acrylate, with from 20 to 5 percent of a haloalkyl acrylate wherein the halogen is selected from the class consisting of chlorine and bromine.

WILLIAM C. MAST.
CHESSIE E. REHBERG.
CHARLES H. FISHER.

REFERENCES CITED

The following references are of record in the file of this patent:

UNITED STATES PATENTS

| Number | Name | Date |
|---|---|---|
| 1,121,134 | Rohm | Dec. 15, 1914 |
| 1,953,052 | Fikentscher | Oct. 31, 1933 |
| 2,105,361 | Nowak | Jan. 11, 1938 |
| 2,321,048 | Schildknecht | June 8, 1943 |
| 2,326,095 | D'Ianni | Aug. 3, 1943 |
| 2,379,297 | Harmon | June 26, 1945 |
| 2,384,889 | Clifford | Sept. 18, 1945 |
| 2,385,258 | Clifford | Sept. 18, 1945 |
| 2,404,781 | Arnold | July 30, 1946 |
| 2,410,103 | Rainard | Oct. 29, 1946 |
| 2,414,803 | D'Alelio | Jan. 28, 1947 |
| 2,416,878 | Lindsey | Mar. 4, 1947 |

FOREIGN PATENTS

| Number | Country | Date |
|---|---|---|
| 411,860 | Great Britain | June 13, 1934 |

OTHER REFERENCES

Mast et al., Ind. and Eng. Chem., vol. 36, pages 1022–1027, Nov. 1944.

India Rubber World, vol. 110, page 74, Apr. 1944.